US011260629B2

(12) United States Patent
Cleary et al.

(10) Patent No.: US 11,260,629 B2
(45) Date of Patent: Mar. 1, 2022

(54) LAMINATE HAVING ORGANIC INK DECORATION AND HIGH IMPACT RESISTANCE

(71) Applicant: Corning Incorporated, Corning, NY (US)

(72) Inventors: Thomas Michael Cleary, Elmira, NY (US); Mark Stephen Friske, Campbell, NY (US); Timothy Scott Huten, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 42 days.

(21) Appl. No.: 16/613,010

(22) PCT Filed: May 15, 2018

(86) PCT No.: PCT/US2018/032625
§ 371 (c)(1),
(2) Date: Nov. 12, 2019

(87) PCT Pub. No.: WO2018/213213
PCT Pub. Date: Nov. 22, 2018

(65) Prior Publication Data
US 2020/0171800 A1 Jun. 4, 2020

Related U.S. Application Data

(60) Provisional application No. 62/506,018, filed on May 15, 2017.

(51) Int. Cl.
*B32B 15/04* (2006.01)
*B32B 17/10* (2006.01)

(52) U.S. Cl.
CPC .. *B32B 17/10266* (2013.01); *B32B 17/10036* (2013.01); *B32B 17/10137* (2013.01);
(Continued)

(58) Field of Classification Search
CPC .................. B32B 17/10036; B32B 17/10137
(Continued)

(56) References Cited

U.S. PATENT DOCUMENTS 5,324,373 A * 6/1994 Gillner .............. B32B 17/10036
156/99
5,914,178 A * 6/1999 Sol .................... B32B 17/10036
428/195.1
(Continued)

FOREIGN PATENT DOCUMENTS

EP 2722318 A1 4/2014
JP 06079639 B2 2/2017
(Continued)

OTHER PUBLICATIONS

Barry, C., "Unexpected Breakage in Ceramic Enameled (FRIT) HS IG Spandrels."; Insulating Glass Manufacturer's Alliance Winter Conference; 11 Pages; Feb. 2015.
(Continued)

*Primary Examiner* — Lauren R Colgan
(74) *Attorney, Agent, or Firm* — William M. Johnson

(57) ABSTRACT

A decorated laminate including: an outer ply; an inner ply; a polymer interlayer between the inner ply and the outer ply; and organic ink printed decoration on one or both of internal surfaces of the laminate between the outer ply and the polymer interlayer or between the inner ply and polymer interlayer, wherein the decorated laminate has a stone impact resistance as defined herein. Also disclosed is a method of making and using the decorated laminate.

19 Claims, 6 Drawing Sheets

(52) U.S. Cl.
CPC .. *B32B 17/10761* (2013.01); *B32B 17/10871* (2013.01); *B32B 2307/558* (2013.01); *B32B 2605/006* (2013.01)

(58) Field of Classification Search
USPC .................................. 428/426, 428, 432, 434
See application file for complete search history.

(56) References Cited

U.S. PATENT DOCUMENTS

| | | | |
|---|---|---|---|
| 6,495,261 B1 | 12/2002 | Gagliardi et al. | |
| 7,278,730 B2 * | 10/2007 | Elwakil | B32B 17/10247 347/101 |
| 7,625,627 B2 * | 12/2009 | Smith | B32B 17/10 428/201 |
| 7,955,470 B2 | 6/2011 | Kapp et al. | |
| 8,002,938 B2 * | 8/2011 | Elwakil | B32B 17/10247 156/277 |
| 8,287,958 B2 | 10/2012 | Lyon et al. | |
| 9,044,919 B2 | 6/2015 | Offermann et al. | |
| 9,278,884 B2 * | 3/2016 | Chen | B41M 5/0047 |
| 9,919,496 B2 | 3/2018 | Michetti et al. | |
| 2004/0234735 A1 * | 11/2004 | Reynolds | B41M 5/0047 428/204 |
| 2005/0285920 A1 * | 12/2005 | Smith | B44F 1/066 347/105 |
| 2006/0154085 A1 * | 7/2006 | Cleary | B32B 17/10761 428/426 |
| 2007/0172637 A1 * | 7/2007 | Hayes | B32B 27/36 428/220 |
| 2012/0025559 A1 * | 2/2012 | Offermann | B32B 17/10761 296/84.1 |
| 2012/0328843 A1 * | 12/2012 | Cleary | B32B 17/10137 428/174 |
| 2013/0186141 A1 | 7/2013 | Henry | |
| 2013/0295357 A1 * | 11/2013 | Cleary | B32B 17/10119 428/215 |
| 2013/0295358 A1 | 11/2013 | Paulus et al. | |
| 2014/0093702 A1 * | 4/2014 | Kitajima | C03B 23/0252 428/174 |
| 2015/0251377 A1 * | 9/2015 | Cleary | B32B 17/10036 428/172 |
| 2016/0075111 A1 * | 3/2016 | Dixon | B32B 17/10761 428/172 |
| 2016/0243796 A1 * | 8/2016 | Mannheim Astete | B32B 17/1077 |
| 2016/0303831 A1 * | 10/2016 | Cloots | B32B 17/10348 |
| 2017/0021597 A1 * | 1/2017 | Michetti | B32B 17/10807 |
| 2017/0165944 A1 | 6/2017 | Nania et al. | |
| 2018/0154615 A1 * | 6/2018 | Dohn | B32B 17/10091 |
| 2018/0207911 A1 * | 7/2018 | Lampman | B32B 17/10559 |
| 2018/0345644 A1 * | 12/2018 | Kang | B32B 17/10743 |
| 2019/0150229 A1 * | 5/2019 | Lau | B32B 17/10036 219/202 |
| 2019/0315113 A1 * | 10/2019 | Park | B28D 1/18 |

FOREIGN PATENT DOCUMENTS

| | | |
|---|---|---|
| WO | 2013/181505 A1 | 12/2013 |
| WO | 2015/092385 A1 | 6/2015 |
| WO | 2016/196546 A1 | 12/2016 |
| WO | 2017106081 A1 | 6/2017 |

OTHER PUBLICATIONS

Barry, C., "Why Glass Sometimes Breaks." NSG Group; PV Module Reliability Workshop; 49 Pages; Feb. 19, 2010.

Eliasova, M., "Advanced Design of Glass Structures." Lecture L5_Me Glued Connection Czech Technical University in Prague; 60 Pages; 2011.

International Search Report and Written Opinion of the International Searching Authority in Corresponding PCT Application No. PCT/US2018/032625; dated Aug. 29, 2018; 13 Pages; European Patent Office.

Sakoske, G. et al., "Pressure Forming of Automotive Glass and Challenges for Glass-Ceramic Enamels." Glass Processing Days: 6th International Conference on Architectural and Automotive Glass; vol. 34; 10 Pages; Jun. 1999.

U.S. Appl. No. 14/559,345, filed Dec. 3, 2014, entitled "Non-Yellowing Glass Laminate Structure."

U.S. Appl. No. 62/268,111, filed Dec. 16, 2015.

U.S. Appl. No. 62/269,356, filed Dec. 18, 2015.

U.S. Appl. No. 62/343,937, filed Jun. 1, 2016, entitled "Asymmetric Glass Laminates,".

* cited by examiner

LAMINATE HAVING ORGANIC INK DECORATION AND HIGH IMPACT RESISTANCE

CROSS-REFERENCE TO RELATED APPLICATIONS

This application is a national stage application under 35 U.S.C. § 371 of International Application No. PCT/US2018/032625, filed on May 15, 2018, which claims the benefit of priority under 35 U.S.C. § 119 of U.S. Provisional Application Serial No. 62/506018 filed on May 15, 2017, the content of which is relied upon and incorporated herein by reference in its entirety.

The disclosure relates to laminates having organic ink decoration.

SUMMARY

A first aspect of this disclosure pertains to a decorated laminate comprising: an outer ply comprising an un-strengthened glass substrate having a thickness of from 1.5 to 3 mm; an inner ply comprising a chemically strengthened glass substrate having a thickness of from 0.05 to 0.7 mm; a polymer interlayer between the inner ply and the outer ply; and organic ink decoration disposed on one or both of the outer ply and inner ply such that the organic ink decoration is disposed between the outer ply and the interlayer, between the inner ply and the interlayer, or between both the between the outer ply and the interlayer and between the inner ply and the interlayer, wherein the decorated laminate has a simulated stone impact resistance as measured by break velocity of from 40 to 95% at from 75 to 85 mile per hour.

A second aspect of this disclosure pertains to a decorated laminate comprising: an outer ply having a thickness of from 1.5 to 3 mm; an inner ply comprising a strengthened glass substrate having a thickness of from 0.05 to 1.2 mm; an interlayer between the inner ply and the outer ply; and organic ink decoration disposed on one or both of the outer ply and inner ply such that the organic ink decoration is disposed between the outer ply and the interlayer, between the inner ply and the interlayer, or between both the between the outer ply and the interlayer and between the inner ply and the interlayer, wherein the decorated laminate has a simulated stone impact resistance as measured by break velocity of from 40 to 95% at from 75 to 85 mile per hour.

DETAILED DESCRIPTION

Figure 1:
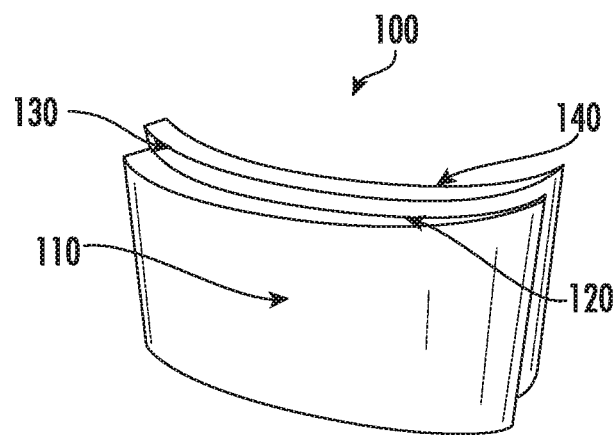
FIG. 1 illustrates a known configuration of a commercial laminate (100) such as windshields, which usually includes two plies of glass and a polymer interlayer. The two plies of glass can be flat or formed to three-dimensional shapes. In this disclosure the side of the laminate facing outside the vehicle when installed was labeled as surface 1 (S1; exterior) (110). The opposite side of the S1 surface, which is bonded onto the interlayer, is labeled the surface 2 (S2; bonded to interlayer) (120). Meanwhile, the side of the laminate facing inside the vehicle when installed is labeled the surface 4 (S4; interior) (140), and its opposite side is labeled the surface 3 (S3; bonded to interlayer) (130).
Figure 2A:
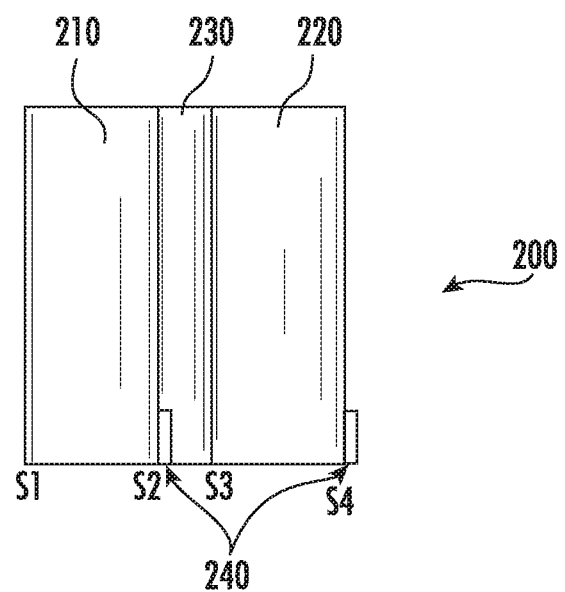
FIG. 2A to 2C show cross-sectional schematics of known conventional auto laminates (200) having an outer ply (210), inner ply (220), and a polymer interlayer (230) such as PVB, showing that decorative glass/ceramic enamel frit (240) is located on S2, S4, or both S2 and S4 surfaces.
Figure 2B:
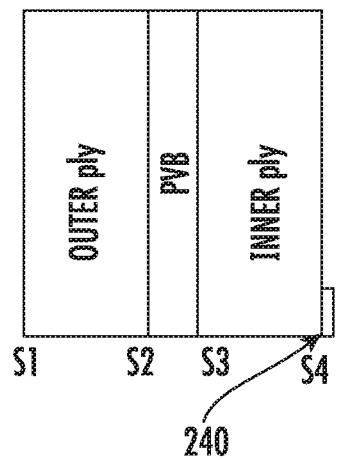
Figure 2C:
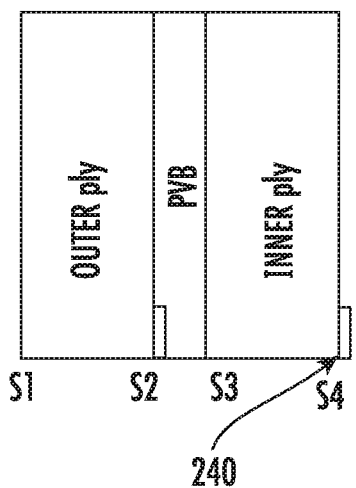
Figure 3:
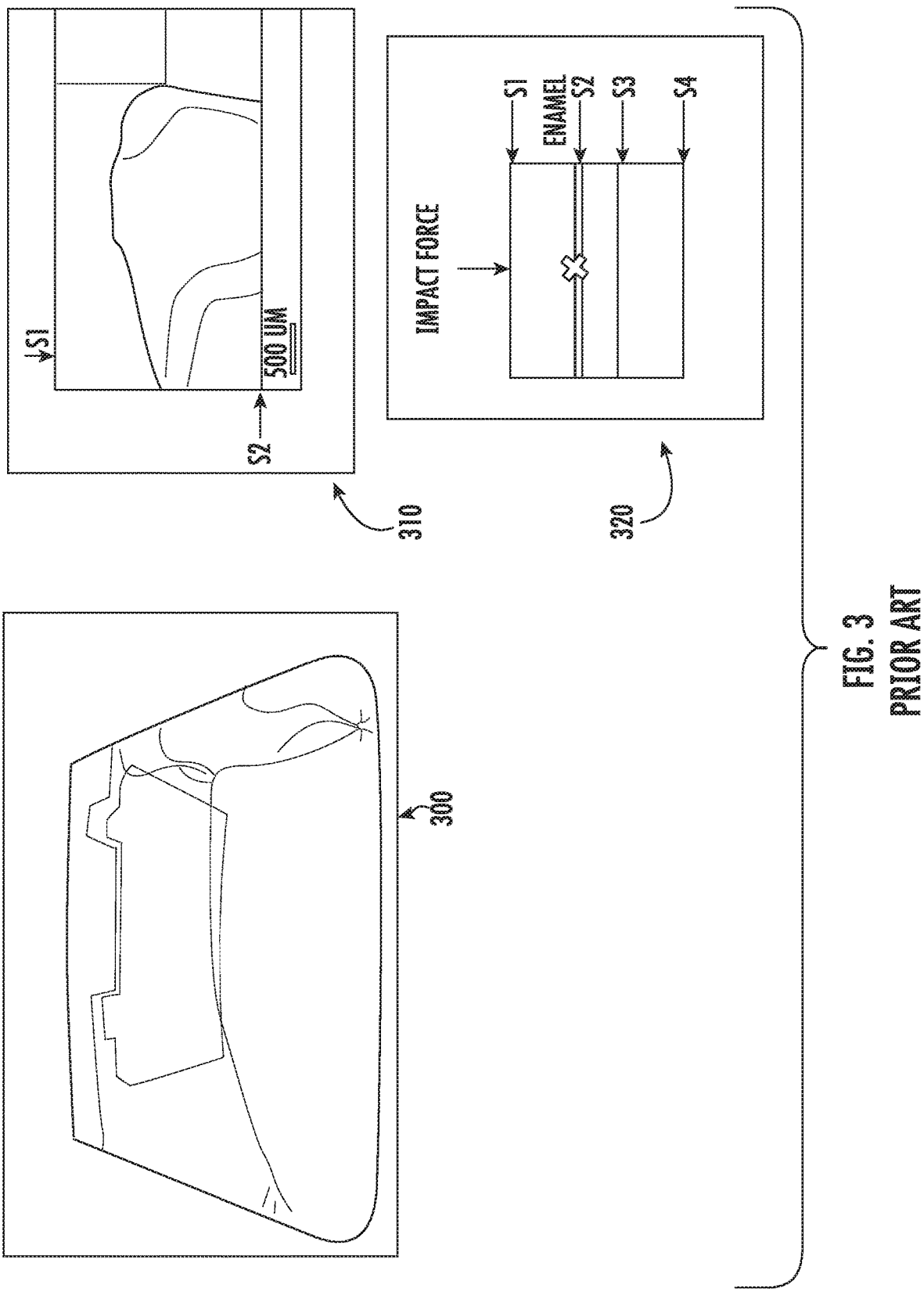
FIG. 3 shows a known roof-glass laminate that failed in the field (300); the cross-section of the fracture (310) detailing that the failure origin occurred near the lead edge (lower portion of the figure) in the glass/ceramic enamel frit present on S2; and a schematic (320) of the failed part where the "X" denotes the location of the fracture origin.
Figure 4:
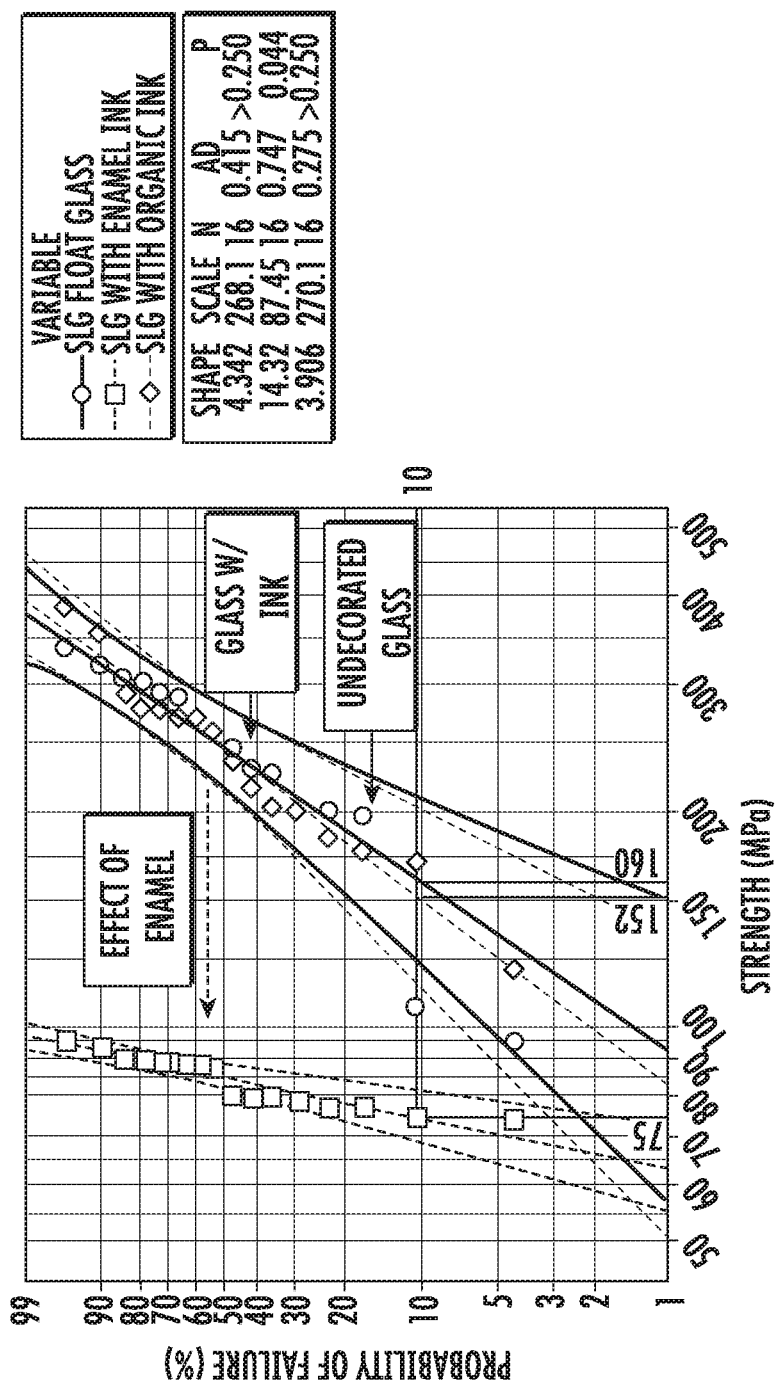
FIG. 4 shows a Weibull plot of strength (measured via ring-on-ring method) for bare float glass, float glass with glass/ceramic enamel frit, and float glass with organic ink. The data shows that glass/ceramic enamel frit degrades strength by greater than 50%; whereas, in constrast, the presence of organic ink has no significant effect on strength of the glass.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

Definitions

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

Laminates comprising opposing glass plies (which can be sheets) with an intervening interlayer that can be used as windows, automotive glazings such as windshields or sunroofs. The laminate may be described in terms of surfaces. Surface 4 is on a first major surface of one glass ply and forms the innermost surface (forming a portion of the interior of a vehicle or building) and surface 3 is the opposing major surface from surface 4 of the same glass ply. Surface 2 is the major surface of the other glass ply and is adjacent surface 3 (with the interlayer separating surface 2 from surface 3), and surface 1 is the opposing major surface from surface 2 of the same glass ply. Surface 1 forms the exterior surface of the laminate (i.e., facing the exterior of a vehicle or building). In certain applications, laminates having high mechanical strength, resistance to damage from impinging objects, and sound attenuating properties are desirable to provide a safe barrier while reducing the potential of at least one substrate forming the laminate fracturing due to surface cracks. In many cases, laminates include a decorative glass or ceramic enamel frit fused onto any one or more of surfaces 2, 3, 4, or combinations thereof. This decorative glass/ceramic enamel frit is applied to areas, usually adjacent to the perimeter of the laminate. In some embodiments, the frit acts as a UV-blocking layer to prevent UV light degradation of adhesive materials used to attach a laminate to its frame or structure, and for cosmetic purposes, such as obscuring from view the framing and adhesives required to secure the glass laminate in position. The presence of glass/ceramic enamel frit on surface 2 has recently been found to have led to the fracture of laminate roof panels due to flexure of this surface likely caused by impact to surface of the laminate.

During use, it is desirable that the glass laminates resist fracture in response to external impact events. Fracture due to flexure of decorative glass/ceramic enamel frit on surfaces 2 or 4 or both, has been identified as a failure mechanism for real world laminates.

A main cause of glass laminate replacements in the field is due to stone impact. Stone impact can cause fracture of the laminates by several mechanisms including blunt (Hertzian) contact, sharp contact, and flexure. Blunt (Hertzian) contact creates a ring/cone crack which initiates from an existing flaw on surface 1 (which forms the exterior facing surface of the laminate) and then propagates through the thickness of the exterior ply. Sharp contact creates damage that propagates through the thickness of the outer ply and then creates radial/median cracks. Flexure of the laminate activates flaws on surface #2 (surface of the outer ply adjacent the interlayer) and/or surface #4 (interior surface of the inner ply). Decorative glass/ceramic enamel frit has been found to degrade the strength of the surface or glass ply to which frit is adhered. To improve the impact resistance, it is desirable to address the failure mode of the low impact resistance due to the decorative glass/ceramic enamel frit, particularly as laminates are made thinner, as flexure becomes more critical as the greater deflection during impact will result in higher and larger stress fields on surfaces 2 and 4.

One or more embodiments of this disclosure pertain to a decorated laminate comprising: an outer ply glass substrate; a strengthened inner ply glass substrate; an interlayer disposed between the inner ply and the outer ply; and organic ink printed decoration on one or both of internal surfaces of the laminate between the un-strengthened glass and polymer interlayer, between the strengthened glass and polymer interlayer, or between both, i.e., S2, S3, or both. In one or more embodiments, surface 1, surface 4 or both surfaces 1 and 4 are substantially free of ink.

In one or more embodiments, the outer ply may be unstrengthened, annealed or heat strengthened; however, the outer ply has a lower strength level (in terms of surface compressive stress, depth or compressive stress layer or both surface compressive stress and depth or compressive stress layer) than the strengthened inner ply. In one or more embodiments, the outer ply has a thickness, for example, in a range from greater than 1.5 mm to 4 mm, from greater than 1.5 mm to 3.8 mm, from greater than 1.5 mm to 3.6 mm, from greater than 1.5 mm to 3.5 mm, from greater than 1.5 mm to 3.4 mm, from greater than 1.5 mm to 3.2 mm, from greater than 1.5 mm to 3 mm, from greater than 1.5 mm to 2.8 mm, from greater than 1.5 mm to 2.6 mm, from greater than 1.5 mm to 2.5 mm, from greater than 1.5 mm to 2.2 mm, from greater than 1.5 mm to 2 mm, from 1.6 mm to about 4 mm, from 1.8 mm to about 4 mm, from 2 mm to about 4 mm, from 2.1 mm to about 4 mm, from 2.5 mm to about 4 mm, from 2.8 mm to about 4 mm, from 3 mm to about 4 mm, or from 3.5 mm to about 4 mm, including intermediate values and ranges.

In one or more embodiments, the inner ply has a thickness in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the outer ply has an outer ply thickness ($t_o$) and an inner ply has an inner ply thickness ($t_i$) in a range of 0.05 mm and 1 mm such that $t_o/t_i$ is in a range from 1 and 20, of from 3 and 20, of from 3 and 15, of from 4 and 10, and like ratios, including intermediate values and ranges.

The outer ply may be any one of a soda lime glass, aluminosilicate glass, borosilicate glass, boroaluminosilicate glass, alkali-containing aluminosilicate glass, alkali-containing borosilicate glass, and alkali-containing boroaluminosilicate glass. The inner ply may be any one of a soda lime glass, aluminosilicate glass, borosilicate glass, boroaluminosilicate glass, alkali-containing aluminosilicate glass, alkali-containing borosilicate glass, and alkali-containing boroaluminosilicate glass.

In one or more embodiments, the inner glass ply may be strengthened. In one or more embodiments, the inner glass ply may be strengthened to include a compressive stress that extends from a surface to a depth of compression or depth of compressive stress layer (DOL). The compressive stress at the surface is referred to as the surface CS. The CS regions are balanced by a central portion exhibiting a tensile stress. At the DOL, the stress crosses from a compressive stress to a tensile stress. The compressive stress and the tensile stress are provided herein as absolute values.

In one or more embodiments, the inner glass ply is strengthened in two or more steps to achieve a first partially strength level (i.e., strengthened to a degree that is a portion of the final strength level in terms of surface CS and DOL) and a final strength level. In one or more embodiments, the strengthening process used to strengthen the inner glass ply may include any one or combinations of a thermal strengthening process, a chemical strengthening process and a mechanical strengthening process.

In one or more embodiments, the inner glass ply may be mechanically strengthened by utilizing a mismatch of the coefficient of thermal expansion between portions of the article to create a compressive stress region and a central region exhibiting a tensile stress. In some embodiments, the inner glass ply may be thermally strengthened by heating the glass to a temperature above the glass transition point and then rapidly quenching.

In one or more embodiments, the inner glass ply may be chemically strengthened by ion exchange. In the ion exchange process, ions at or near the surface of the inner glass ply are replaced by or exchanged with larger ions having the same valence or oxidation state. In embodiments in which the inner glass ply comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the inner glass ply generate a stress. It should be understood that any alkali metal oxide containing inner glass ply can be chemically strengthened by an ion exchange process.

Ion exchange processes are typically carried out by immersing an inner glass ply in a molten salt bath (or two or more molten salt baths) containing the larger ions to be exchanged with the smaller ions in the inner glass ply. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the inner glass ply in a salt bath (or baths), use of multiple salt baths, additional steps such as annealing, washing, and the like, are generally determined by the composition of the inner glass ply (including the structure of the article and any crystalline phases present) and the desired DOL and CS of the inner glass ply that results from strengthening. Exemplary molten bath composition may include nitrates, sulfates, and chlorides of the larger alkali metal ion. Typical nitrates include KNO3, NaNO3, LiNO3, NaSO4 and combinations thereof. The temperature of the molten salt bath typically is in a range from about 380° C. up to about 450° C., while immersion times range from about 15 minutes up to about 100 hours depending on inner glass ply thickness, bath temperature and glass (or monovalent ion) diffusivity. However, temperatures and immersion times different from those described above may also be used.

In one or more embodiments, the inner glass ply may be immersed in a molten salt bath of 100% NaNO3, 100% KNO3, or a combination of NaNO3 and KNO3 having a temperature from about 370° C. to about 480° C. In some embodiments, the inner glass ply may be immersed in a molten mixed salt bath including from about 1% to about 99% KNO3 and from about 1% to about 99% NaNO3. In one or more embodiments, the inner glass ply may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the inner glass ply may be immersed in a molten, mixed salt bath including $NaNO_3$ and $KNO_3$ (e.g., 49%/51%, 50%/50%, 51%/49%) having a temperature less than about 420° C. (e.g., about 400° C. or about 380° C.). for less than about 5 hours, or even about 4 hours or less.

Ion exchange conditions can be tailored to provide a "spike" or to increase the slope of the stress profile at or near the surface of the resulting inner glass ply. The spike may result in a greater surface CS value. This spike can be achieved by single bath or multiple baths, with the bath(s) having a single composition or mixed composition, due to the unique properties of the glass compositions used in the inner glass ply described herein.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the inner glass ply. In other embodiments, the maximum compressive stress may occur at a depth below the surface, giving the compressive profile the appearance of a "buried peak."

DOL may be measured by FSM or by a scattered light polariscope (SCALP) (such as the SCALP-04 scattered light polariscope available from Glasstress Ltd., located in Tallinn Estonia), depending on the strengthening method and conditions. When the inner glass ply is chemically strengthened by an ion exchange treatment, FSM or SCALP may be used depending on which ion is exchanged into the inner glass ply. Where the stress in the inner glass ply is generated by exchanging potassium ions into the inner glass ply, FSM is used to measure DOL. Where the stress is generated by exchanging sodium ions into the inner glass ply, SCALP is used to measure DOL. Where the stress in the inner glass ply is generated by exchanging both potassium and sodium ions into the glass, the DOL is measured by SCALP, since it is believed the exchange depth of sodium indicates the DOL and the exchange depth of potassium ions indicates a change in the magnitude of the compressive stress (but not the change in stress from compressive to tensile); the exchange depth of potassium ions in such inner glass ply is measured by FSM. Central tension or CT is the maximum tensile stress and is measured by SCALP.

In one or more embodiments, the inner glass ply maybe strengthened to exhibit a DOL that is described a fraction of the thickness t of the inner glass ply (as described herein). For example, in one or more embodiments, the DOL may be equal to or greater than about 0.05 t, equal to or greater than about 0.1 t, equal to or greater than about 0.11 t, equal to or greater than about 0.12 t, equal to or greater than about 0.13 t, equal to or greater than about 0.14 t, equal to or greater than about 0.15 t, equal to or greater than about 0.16 t, equal to or greater than about 0.17 t, equal to or greater than about 0.18 t, equal to or greater than about 0.19 t, equal to or greater than about 0.2 t, equal to or greater than about 0.21 t. In some embodiments, The DOL may be in a range from about 0.08 t to about 0.25 t, from about 0.09 t to about 0.25 t, from about 0.18 t to about 0.25 t, from about 0.11 t to about 0.25 t, from about 0.12 t to about 0.25 t, from about 0.13 t to about 0.25 t, from about 0.14 t to about 0.25 t, from about 0.15 t to about 0.25 t, from about 0.08 t to about 0.24 t, from about 0.08 t to about 0.23 t, from about 0.08 t to about 0.22 t, from about 0.08 t to about 0.21 t, from about 0.08 t to about 0.2 t, from about 0.08 t to about 0.19 t, from about 0.08 t to about 0.18 t, from about 0.08 t to about 0.17 t, from about 0.08 t to about 0.16 t, or from about 0.08 t to about 0.15 t. In some instances, the DOL may be about 20 µm or less. In one or more embodiments, the DOL may be about 40 µm or greater (e.g., from about 40 µm to about 300 µm, from about 50 µm to about 300 µm, from about 60 µm to about 300 µm, from about 70 µm to about 300 µm, from about 80 µm to about 300 µm, from about 90 µm to about 300 µm, from about 100 µm to about 300 µm, from about 110 µm to about 300 µm, from about 120 µm to about 300 µm, from about 140 µm to about 300 µm, from about 150 µm to about 300 µm, from about 40 µm to about 290 µm, from about 40 µm to about 280 µm, from about 40 µm to about 260 µm, from about 40 µm to about 250 µm, from about 40 µm to about 240 µm, from about 40 µm to about 230 µm, from about 40 µm to about 220 µm, from about 40 µm to about 210 µm, from about 40 µm to about 200 µm, from about 40 µm to about 180 µm, from about 40 µm to about 160 µm, from about 40 µm to about 150 µm, from about 40 µm to about 140 µm, from about 40 µm to about 130 µm, from about 40 µm to about 120 µm, from about 40 µm to about 110 µm, or from about 40 µm to about 100 µm.

In one or more embodiments, the strengthened inner glass ply may have a CS (which may be found at the surface or a depth within the inner glass ply) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater. In one or more embodiments, the strengthened inner glass ply may have a CS (which may be found at the surface or a depth within the inner glass ply) from about 200 MPa to about 1500 MPa, from about 250 MPa to about 1500 MPa, from about 300 MPa to about 1500 MPa, from about 350 MPa to about 1500 MPa, from about 400 MPa to about 1500 MPa, from about 450 MPa to about 1500 MPa, from about 500 MPa to about 1500 MPa, from about 550 MPa to about 1500 MPa, from about 600 MPa to about 1500 MPa, from about 200 MPa to about 1400 MPa, from about 200 MPa to about 1300 MPa, from about 200 MPa to about 1200 MPa, from about 200 MPa to about 1100 MPa, from about 200 MPa to about 1050 MPa, from about 200 MPa to about 1000 MPa, from about 200 MPa to about 950 MPa, from about 200 MPa to about 900 MPa, from about 200 MPa to about 850 MPa, from about 200 MPa to about 800 MPa, from about 200 MPa to about 750 MPa, from about 200 MPa to about 700 MPa, from about 200 MPa to about 650 MPa, from about 200 MPa to about 600 MPa, from about 200 MPa to about 550 MPa, or from about 200 MPa to about 500 MPa.

In one or more embodiments, the strengthened inner glass ply may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa, from about 50 MPa to about 100 MPa, from about 60 MPa to about 100 MPa, from about 70 MPa to about 100 MPa, from about 80 MPa to about 100 MPa, from about 40 MPa to about 90 MPa, from about 40 MPa to about 80 MPa, from about 40 MPa to about 70 MPa, or from about 40 MPa to about 60 MPa.

In one or more embodiments, the interlayer disposed between the inner glass ply and the outer glass ply is a polymer interlayer. In one or more embodiments the interlayer may include any one or more of polyvinyl butyral (PVB), ethylene-vinyl acetate copolymer (EVA), thermoplastic urethane (TPU), polyvinyl chloride, ionomer (SentryGlas®), acrylic, thermoplastic elastomer (TPE). In embodiments, the interlayer can have a thickness, for example, of from 0.125 mm to 3.0 mm, or from 0.25 mm to 1.6 mm.

In embodiments, the decorated laminate has a simulated stone impact resistance as measured by break velocity, for example, of from 40 to 95% at from 75 to 85 miles per hour.

In embodiments, the organic ink printed decoration can have a thickness of from 5 to 25 microns, of from 5 to 20 microns, of from 5 to 15 microns, of from 5 to 12 microns, of from 6 to 12 microns, of from 7 to 10 microns, including intermediate values and ranges. In one or more embodiments, the organic ink printed decoration has a thickness, after for example, printing, drying and curing, can be, for example, of from 8 to 10 microns. Curing can be accomplished by any suitable means such as using heat (i.e., thermally), irradiation (e.g., UV light), and like methods, or a combination thereof.

Another aspect of this disclosure pertains to a method of making the above mentioned laminate. In one or more embodiments, the method includes combining, in order, the outer ply, the interlayer, and the inner ply in a stack; and applying heat and pressure to the stack to form the laminate.

In embodiments, at least one interior surface (e.g., S2, S3, or both S2 and S3) within the stack has organic ink printed decoration thereon prior to combining in a stack.

Embodiments of the described laminates mitigate the impact failure mode in the enamel region by replacing the decorative glass/ceramic enamel frit, which is typically fused on the glass surfaces #2 (S2), #4 (S2), or both, with an organic ink material which does not cause strength (and therefore impact resistance) degradation. Due to the nature of the organic ink, it can be deposited, for example, on S2, S3, or both. The organic ink can be composed of materials that include, for example: a polymeric system that acts as the continuous matrix of the ink layer, such as acrylic, epoxy, or polyester; organic or inorganic pigments; and fillers, suitable to achieve the desired color and opacity of the ink layer; additives and solvents as necessary to facilitate the process to uniformly apply the organic ink on to the glass surface. The organic ink is preferably a liquid during its application to the glass surface, and is transformed to a solid layer by one or more methods including, for example: curing by exposure to UV light; curing by exposure to heat; curing at ambient conditions with time; evaporation or removal of solvents, or combinations thereof.

In one or more specific embodiments, the laminate includes a relatively thick (1.6 to 3 mm thick) outer ply of annealed glass, an organic ink layer is disposed on S2, an interlayer such as polyvinyl butyral (PVB) disposed on the organic ink layer, and a thin inner ply of strengthened glass (e.g., chemically, thermally, and/or mechanically strengthened glass ply) disposed on the interlayer. In embodiments, additional desirable components can be selected such an infra-red reflective ("IRR") coating on S2 or S3, or an IRR film laminated in between the layers of PVB. In embodiments, an interlayer having acoustic dampening can be selected. In embodiments, a wedged PVB can be selected for use with a heads up display (HUD) system, with or without an acoustic dampening inter-layer.

EXAMPLES

The following Examples demonstrate making, use, and analysis of the disclosed laminates and methods in accordance with the above general procedures.

Example 1

Laminate Fabrication

Glass laminates can be adapted to provide an optically transparent barrier in architectural and automotive openings, e.g., automotive glazings. Glass laminates can be formed using a variety of processes. The assembly, in an exemplary embodiment, involves laying down a first sheet of glass, overlaying a polymer interlayer such as a PVB sheet, laying down a second sheet of glass, and then trimming the excess PVB to the edges of the glass sheets. Any one or both of these sheets of glass can be strengthened or un-strenghtened glass. A tacking step can include, for example, expelling most of the air from the interfaces and partially bonding the PVB to the glass sheets. The finishing step, typically carried out at elevated temperature and pressure, completes the mating of each of the glass sheets to the polymer interlayer. In the foregoing embodiment, the first sheet can be a chemically-strengthened glass sheet, and the second sheet can be a non-chemically-strengthened glass sheet or vice versa.

A thermoplastic material such as PVB can be applied as a preformed polymer interlayer. The thermoplastic layer can, in certain embodiments, have a thickness of at least 0.125 mm, e.g., 0.125, 0.25, 0.38, 0.5, 0.7, 0.76, 0.81, 1, 1.14, 1.19, or 1.2 mm. The interlayer or thermoplastic layer can have a thickness of less than or equal to 1.6 mm, e.g., from 0.4 to 1.2 mm, such as about 0.4, 0.5, 0.6, 0.7, 0.8, 0.9, 1.0, 1.1, or 1.2 mm. The interlayer or thermoplastic layer can have thicknesses greater than 1.6 mm, e.g., from 1.6 mm to 3.0 mm, from 2.0 mm to 2.54 mm, and like ranges, including intermediate values and ranges. The thermoplastic layer can cover most or, preferably, substantially all of the two opposed major faces of the glass. The thermoplastic layer can also cover the edge faces of the glass. The glass sheets in contact with the thermoplastic layer can be heated above the softening point of the thermoplastic, such as, for example, at least 5° C. or 10° C. above the softening point, to promote bonding of the thermoplastic material to the respective glass sheets. The heating can be performed with the glass in contact with the thermoplastic layers under pressure. One or more polymer interlayers can be incorporated into an exemplary glass laminate structure. A plurality of interlayers can provide, for example, complimentary or distinct functionality, including impact performance, adhesion promotion, acoustic control, UV transmission control, tinting, coloration, IR transmission control, and like functions.

Example 2

Stone Impact Resistance Evaluation

The stone impact resistance of the disclosed and comparative commercial laminates was tested with a 1 g ball bearing (6.35 mm dia.) at a 45-degree angle of incidence. A stair-step method was used starting with a low velocity and increasing the velocity in increments of about 5 mph until fracture was observed. The procedure was repeated for each data point in the Weibull plot of FIG. 5 for a failure rate or failure percentage of the disclosed laminates from 40 to 95% at a break velocity of from 75 to 85 miles per hour.

Figure 5:
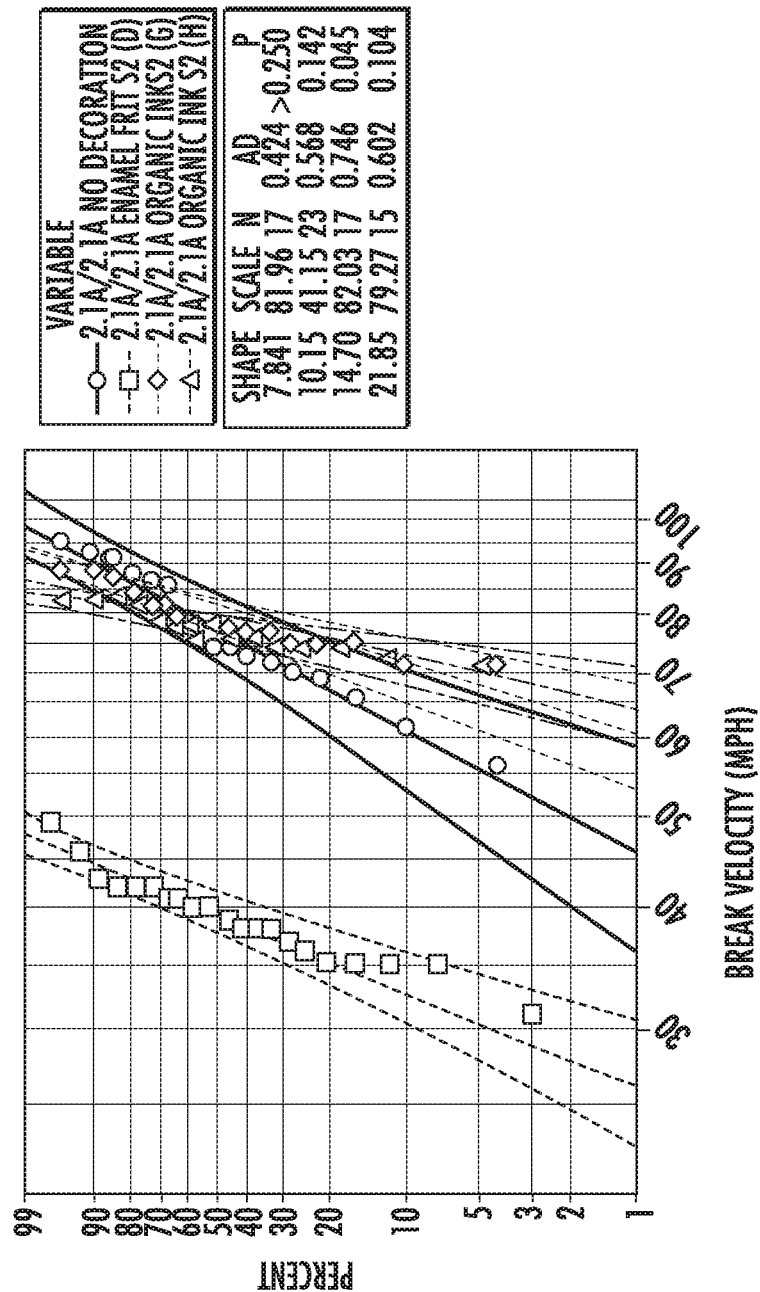
FIG. 5 shows a Weibull plot showing the velocity to induce fracture when a laminated glass panel is impacted with a 1-gram ball bearing at 45-degree angle of incidence. The data shows that laminates made with organic ink on S2 require a much higher velocity to induce fracture compared to laminates made with a conventional construction with conventional glass/ceramic enamel frit on surface 2. It also shows that using organic ink on S2 does not have a negative effect on the impact resistance compared to a laminate with no decoration on S2.
Figure 6:
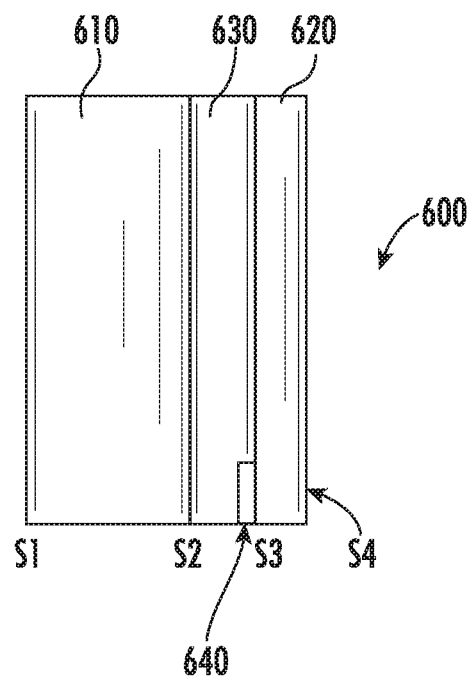
FIG. 6 shows a schematic of an embodiment of the disclosure showing a laminate (600) having an outer ply (610), inner ply (620), and a polymer interlayer (630) such as PVB, with the decorative organic ink (640) placed on S3. In other embodiments the ink (640) can located on surface S2, S3, or S2 and S3. In a preferred embodiment, the laminate is highly asymmetric with, for example, the outer ply at least 2:1 thicker than the inner ply.

FIG. 5 additionally shows that at a break velocity of 50 mph about a 99% failure rate is observed for a laminate having an outer ply of an annealed soda lime glass having a thickness of 2.1 mm and an inner ply of annealed soda lime glass having a thickness of 2.1 mm. The laminate includes an enamel frit decoration disposed on surface 2. The break velocity of this symmetric laminate is shown as square symbols in FIG. 5 and is a comparative example. In contrast, a laminate including the same glass and interlayer construction but no decoration showed little breakage with only about 1% of the laminates failing (shown as dot symbols). In addition, less than 1% of a laminate including the same glass and interlayer construction but with organic ink decoration on surface 2 failed (shown as diamonds). Finally, a laminate construction including an annealed soda lime glass having a thickness of 2.1 mm and an inner ply of chemically strengthened glass having a thickness of 0.7 mm and organic ink decoration on surface 2 showed little breakage with only about 1% of the laminates failing (shown as triangles).

Aspect (1) of this disclosure pertains to a decorated laminate comprising: an outer ply comprising an un-strengthened glass substrate having a thickness of from 1.5 to 3 mm; an inner ply comprising a chemically strengthened glass substrate having a thickness of from 0.05 to 0.7 mm; a polymer interlayer between the inner ply and the outer ply; and organic ink decoration disposed on one or both of the outer ply and inner ply such that the organic ink decoration is disposed between the outer ply and the interlayer, between the inner ply and the interlayer, or between both the between the outer ply and the interlayer and between the inner ply and the interlayer, wherein the decorated laminate has a simulated stone impact resistance as measured by break velocity of from 40 to 95% at from 75 to 85 mile per hour.

Aspect (2) of this disclosure pertains to the decorated laminate of Aspect (1), wherein the organic ink printed decoration has a thickness of from 5 to 25 microns.

Aspect (3) of this disclosure pertains to the decorated laminate of Aspect (1) or Aspect (2), wherein the outer ply comprises soda lime glass, the polymer interlayer comprises polyvinyl butyral, the inner ply is ion-exchanged glass, and the organic ink printed decoration is a curable ink.

Aspect (4) of this disclosure pertains to the decorated laminate of any one of Aspects (1) through (3), wherein the polymer interlayer has a thickness of from 0.125 mm to 3.0 mm.

Aspect (5) of this disclosure pertains to the decorated laminate of any one of Aspects (1) through (4), wherein the polymer interlayer has a thickness of from 0.25 mm to 1.6 mm.

Aspect (6) of this disclosure pertains to the decorated laminate of any one of Aspects (1) through (5), wherein the polymer interlayer is selected from the group consisting of polyvinyl butyral, ethylene vinyl acetate, polyvinyl chloride, ionomers, thermoplastic polyurethane, or combinations thereof.

Aspect (7) of this disclosure pertains to the decorated laminate of any one of Aspects (1) through (6), further comprising a vehicle having at least one decorated laminate.

Aspect (8) of this disclosure pertains to the decorated laminate of any one of Aspects (1) through (7), wherein the outer ply has a thickness ($t_o$) and an inner ply comprising a strengthened glass has a thickness ($t_i$) and a ratio of $t_o:t_i$ of from 1 and 20.

Aspect (9) of this disclosure pertains to making a laminate of any one of Aspects (1) through 8), comprising: combining, in order, the outer ply, the interlayer, and the inner ply in a stack; and applying heat and pressure to the stack to form the laminate.

Aspect (10) of this disclosure pertains to the method of Aspect (9), wherein at least one interior surface within the stack has organic ink printed decoration prior to combining in a stack.

Aspect (11) of this disclosure pertains to a decorated laminate comprising: an outer ply having a thickness of from 1.5 to 3 mm; an inner ply comprising a strengthened glass substrate having a thickness of from 0.05 to 1.2 mm; an interlayer between the inner ply and the outer ply; and organic ink decoration disposed on one or both of the outer ply and inner ply such that the organic ink decoration is disposed between the outer ply and the interlayer, between the inner ply and the interlayer, or between both the between the outer ply and the interlayer and between the inner ply and the interlayer, wherein the decorated laminate has a simulated stone impact resistance as measured by break velocity of from 40 to 95% at from 75 to 85 mile per hour.

Aspect (12) of this disclosure pertains to the decorated laminate of Aspect (11), wherein the outer ply is unstrengthened, annealed or heat strengthened and has surface compressive stress that is less than the inner ply, and wherein the inner ply is strengthened.

Aspect (13) of this disclosure pertains to the decorated laminate of Aspect (11) or Aspect (12), wherein organic ink printed decoration has a thickness of from 5 to 25 microns.

Aspect (14) of this disclosure pertains to the decorated laminate of any one of Aspects (11) through (13), wherein the outer ply comprises soda lime, the interlayer comprises polyvinyl butyral, the inner ply is chemically strengthened, and the organic ink printed decoration is a curable ink.

Aspect (15) of this disclosure pertains to the decorated laminate of any one of Aspects (11) through (14), wherein the polymer interlayer has a thickness of from 0.125 mm to 3.0 mm.

Aspect (16) of this disclosure pertains to the decorated laminate of any one of Aspects (11) through (15), wherein the polymer interlayer has a thickness of from 0.25 mm to 1.6 mm.

Aspect (17) of this disclosure pertains to the decorated laminate of any one of Aspects (11) through (16), wherein the polymer interlayer is selected from the group consisting of polyvinyl butyral, ethylene vinyl acetate, polyvinyl chloride, ionomers, thermoplastic polyurethane, or combinations thereof.

Aspect (18) of this disclosure pertains to the decorated laminate of any one of Aspects (11) through (17), further comprising a vehicle having at least one decorated laminate.

Aspect (19) of this disclosure pertains to the decorated laminate of any one of Aspects (11) through (18), wherein the outer ply has a thickness ($t_o$) and an inner ply comprising a strengthened glass has a thickness ($t_i$) and a ratio of $t_o:t_i$ of from 1 and 20.

The disclosure has been described with reference to various specific embodiments and techniques. However, it should be understood that many variations and modifications are possible while remaining within the scope of the disclosure.

What is claimed is:

1. A decorated laminate comprising:
    an outer ply comprising an un-strengthened glass substrate having a thickness $t_o$ of from 1.5 to 3 mm;
    an inner ply comprising a chemically strengthened glass substrate having a thickness $t_i$ of from 0.05 to 0.7 mm;
    a polymer interlayer between the inner ply and the outer ply; and
    an organic ink decoration disposed and cured on one or both of the outer ply and the inner ply such that the organic ink decoration comprises a solid ink layer bonded to the one or both of the outer ply and the inner ply and disposed between the outer ply and the interlayer, between the inner ply and the interlayer, or between both the outer ply and the interlayer and between the inner ply and the interlayer,
    wherein the decorated laminate has a simulated stone impact resistance as measured by a Weibull distrubution of break velocities of from 40% to 95% when struck by a 1-gram ball bearing at a 45-degree angle of incidence at from 75 to 85 miles per hour.

2. The decorated laminate of claim 1, wherein the organic ink decoration has a thickness of from 5 to 25 microns.

3. The decorated laminate of claim 1, wherein the outer ply comprises soda lime glass the polymer interlayer comprises polyvinyl butyral, the inner ply is ion-exchanged glass.

4. The decorated laminate of claim 1, wherein the polymer interlayer has a thickness of from 0.125 mm to 3.0 mm.

5. The decorated laminate of claim 1, wherein the polymer interlayer has a thickness of from 0.25 mm to 1.6 mm.

6. The decorated laminate of claim 1, wherein the polymer interlayer is selected from the group consisting of polyvinyl butyral, ethylenevinylacetate, polyvinyl chloride, ionomers, thermoplastic polyurethane, or combinations thereof.

7. The decorated laminate of claim 1, wherein the decorated laminate is a component of a vehicle.

8. The decorated laminate of claim 1, wherein a ratio of $t_o:t_i$ is in a range from 1 to 20.

9. A method of making the decorated laminate of claim 1, comprising:
   combining, in order, the outer ply, the polymer interlayer, and the inner ply in a stack; and
   applying heat and pressure to the stack to form the decorated laminate.

10. The method of claim 9 wherein at least one interior surface within the stack has the organic ink decoration disposed thereon prior to the combining into the stack.

11. A decorated laminate comprising:
   an outer ply having a thickness $t_o$ of from 1.5 to 3 mm;
   an inner ply comprising a strengthened glass substrate having a thickness $t_i$ of from 0.05 to 1.2 mm;
   an interlayer between the inner ply and the outer ply; and
   an organic ink decoration disposed and cured on one or both of the outer ply and the inner ply such that the organic ink decoration comprises a solid ink layer bonded to the one or both of the outer ply and the inner ply and disposed between the outer ply and the interlayer, between the inner ply and the interlayer, or between both the outer ply and the interlayer and between the inner ply and the interlayer, wherein the decorated laminate has a simulated stone impact resistance as measured by a Weibull distrubution of break velocities of from 40% to 95% when struck by a 1-gram ball bearing at a 45-degree angle of incidence at from 75 to 85 miles per hour.

12. The decorated laminate of claim 11, wherein the outer ply is unstrengthened, annealed, or heat strengthened and has a surface compressive stress that is less than the inner ply.

13. The decorated laminate of claim 11, wherein the organic ink decoration has a thickness of from 5 to 25 microns.

14. The decorated laminate of claim 11, wherein the outer ply comprises soda lime glass, the interlayer comprises polyvinyl butyral, and the inner ply is chemically strengthened.

15. The decorated laminate of claim 11, wherein the interlayer has a thickness of from 0.125 mm to 3.0 mm.

16. The decorated laminate of claim 11, wherein the interlayer has a thickness of from 0.25 mm to 1.6 mm.

17. The decorated laminate of claim 11, wherein the interlayer comprises a polymer that is selected from the group consisting of polyvinyl butyral, ethylene vinyl acetate, polyvinyl chloride, ionomers, thermoplastic polyurethane, or combinations thereof.

18. The decorated laminate of claim 11, wherein the decorated laminate is a component of a vehicle.

19. The decorated laminate of claim 11, wherein a ratio of $t_o:t_i$ is in a range from 1 to 20.

* * * * *

UNITED STATES PATENT AND TRADEMARK OFFICE
CERTIFICATE OF CORRECTION

| | | |
|---|---|---|
| PATENT NO. | : 11,260,629 B2 | Page 1 of 1 |
| APPLICATION NO. | : 16/613010 | |
| DATED | : March 1, 2022 | |
| INVENTOR(S) | : Thomas Michael Cleary et al. | |

It is certified that error appears in the above-identified patent and that said Letters Patent is hereby corrected as shown below:

On the Title Page

On the page 2, in Column 2, under "Other Publications", Line 4, delete "Connection" and insert -- Connection; --.

In the Claims

In Column 12, Lines 62-63, in Claim 1, delete "distrubution" and insert -- distribution --.

In Column 13, Line 2, in Claim 3, after "glass" insert -- and --.

In Column 14, Line 6, in Claim 11, delete "distrubution" and insert -- distribution --.

Signed and Sealed this
Fifth Day of July, 2022

Katherine Kelly Vidal
*Director of the United States Patent and Trademark Office*